United States Patent
Bidnur et al.

(10) Patent No.: US 7,873,110 B2
(45) Date of Patent: Jan. 18, 2011

(54) MPEG SMART VIDEO TRANSPORT PROCESSOR WITH DIFFERENT TRANSPORT PACKET HANDLING

(75) Inventors: Ravindra Bidnur, Bangalore (IN); Girish Hulmani, Bangalore (IN); Manoj Kumar Vajhallya, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1565 days.

(21) Appl. No.: 10/463,315

(22) Filed: Jun. 17, 2003

(65) Prior Publication Data

US 2004/0258159 A1 Dec. 23, 2004

(51) Int. Cl.
*H04N 7/12* (2006.01)
*G10L 3/02* (2006.01)
(52) U.S. Cl. .................. 375/240.25; 704/212
(58) Field of Classification Search ............ 348/423.1, 348/473, 384.1, 385, 389.1, 404.1, 426.1, 348/441, 469, 468, 385.1; 375/240.25, 240.24, 375/240.16, 240.12; 704/212, 230, 211; 345/2.21, 2.28, 2.29, 2.38, 2.39

See application file for complete search history.

(56) References Cited

U.S. PATENT DOCUMENTS

| | | | | | |
|---|---|---|---|---|---|
| 5,333,135 | A | * | 7/1994 | Wendorf | 370/394 |
| 5,794,181 | A | * | 8/1998 | Benbassat et al. | 704/212 |
| 5,860,021 | A | * | 1/1999 | Klingman | 395/800.32 |
| 6,182,203 | B1 | * | 1/2001 | Simar, Jr. et al. | 712/22 |
| 6,438,145 | B1 | * | 8/2002 | Movshovich et al. | 370/536 |
| 2004/0093485 | A1 | * | 5/2004 | Nguyen et al. | 712/218 |
| 2004/0158857 | A1 | * | 8/2004 | Finseth et al. | 725/39 |
| 2005/0021764 | A1 | * | 1/2005 | Barrall et al. | 709/227 |
| 2006/0209709 | A1 | * | 9/2006 | Kovacevic | 370/252 |

* cited by examiner

*Primary Examiner*—Behrooz Senfi
(74) *Attorney, Agent, or Firm*—McAndrews, Held & Malloy, Ltd.

(57) ABSTRACT

An interrupt sensitive extract byte instruction scheme is presented herein. The interrupt sensitive extract by instruction extracts bytes from data, depending on the presence of an interrupt. The extract byte instruction extracts bytes from data in the absence of the interrupt and does not extract bytes in the presence of the interrupt. The interrupt can be triggered by a set of counters that count the number of extracted bytes. By loading the counters with a particular number, the interrupt can be generated when the particular number of data bytes is extracted.

8 Claims, 5 Drawing Sheets

| | INSTRUCTION | COUNTER | INT | INT. CONTROLLER |
|---|---|---|---|---|
| | | n | -- | -- |
| 1 | EXTBI Rx | n-1 | -- | -- |
| 2 | EXTBI Rx | n-2 | -- | -- |
| n-1 | EXTBI Rx | 1 | -- | -- |
| n | EXTBI Rx | 0 | INTERRUPT | DEFER INTERRUPT |
| n+1 | EXTBI Rx | | | INTERRUPT |

FIGURE 5

| | INSTRUCTION | COUNTER | INT | INT. CONTROLLER |
|---|---|---|---|---|
| | | n | -- | -- |
| 1 | EXTBI Rx | n-1 | -- | -- |
| 2 | EXTBI Rx | n-2 | -- | -- |
| n-1 | EXTBI Rx | 1 | -- | -- |
| n | EXTBI Rx << INTERRUPT SUBROUTINE LAUNCHED >> | 0 | INTERRUPT | INTERRUPT |

FIGURE 6

MPEG SMART VIDEO TRANSPORT PROCESSOR WITH DIFFERENT TRANSPORT PACKET HANDLING

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present application is related to digital video and more particularly to a video transport processor with single-threaded firmware.

Television content distribution is quickly migrating from analog formats to compressed digital formats. Currently, distribution of digital video content for television displays is dominated by use of the MPEG-2 video compression standard (ISO/IEC 13818-2). MPEG-2 and its predecessor MPEG-1 define standards to compress video content using a combination of various techniques to transform the video content into what is known as a video elementary stream.

The video elementary stream comprises a stream of compressed digital video data and is divided into segments that form the payload portion of data packets. The concatenation of the data packets form what is known as the Packetized Elementary Stream (PES). The packets forming the PES, known as PES packets, include a header in addition to the payload. The PES packet header includes a number of fields, including PES_length which indicates the length of the PES packet, and PES_header_length which indicates the PES packet header length.

The PES is then packetized into 188 byte MPEG transport packets. However, in the case of DirecTV™, the PES is packetized into 130 byte MPEG transport packets. The concatenation of the MPEG transport packets form the MPEG transport stream. A decoder receives and parses the MPEG transport stream. The decoder includes a video transport processor that parses the MPEG transport packets of the MPEG transport stream by extracting bytes from the MPEG transport packets.

The video transport processor is usually implemented as an embedded application specific integrated circuit (ASIC), wherein the functions are programmed into firmware. In order to extract bytes from the MPEG packets, the firmware needs to detect the MPEG transport packet boundaries. The variation in packet size makes parsing the MPEG transport packets difficult with single-threaded firmware. Additionally, the transport processor needs to detect other variable length boundaries, such as adaptation field size, private data size in adaptation field, PES packet size, PES payload size, PES header size, and Program Specific Information section size.

One possible solution is to maintain a software counter to count every byte extracted. The firmware can maintain counters to detect if the corresponding segments have been completely processed or not. After the transport processor consumes each byte from the MPEG transport packets, the transport processor checks and maintains the counters. However, the foregoing consumes considerable processing time and substantially increases the byte extraction cycle.

Accordingly, it would be desirable if byte boundaries could be detected without increasing the byte extraction cycle.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to an interrupt sensitive extract byte instruction scheme. A processor executes an interrupt sensitive extract byte instruction causing an input stream handler to extract bytes from a particular packet. The extract byte instruction is tightly coupled with timer-based interrupts. The timer based interrupts monitor the number of bytes extracted. A set of counters maintains a count of the remaining bytes in the packet by decrementing each time the input stream handler consumes a byte in the packet. The counters trigger the system interrupt when the contents therein indicate that the number of bytes that are decoded or consumed are equivalent to the number of bytes in the packet. The presence of the interrupt causes the processor to abort byte extraction until the next packet. The foregoing advantageously permits the processor to extract bytes from data packets using single-threaded firmware.

These and other advantages, aspects, and novel features of the present invention, as well as details of illustrated embodiments, thereof, will be more fully understood from the following description and drawings.

BRIEF DESCRIPTION OF SEVERAL VIEWS OF THE DRAWINGS

FIG. 5 is a program flow diagram describing the operation of the transport processor in accordance with one embodiment of the present invention; and FIG. 6 is a program flow diagram describing the operation of the transport processor in accordance with another embodiment of the present invention.

DETAILED DESCRIPTION OF THE INVENTION

Figure 1:
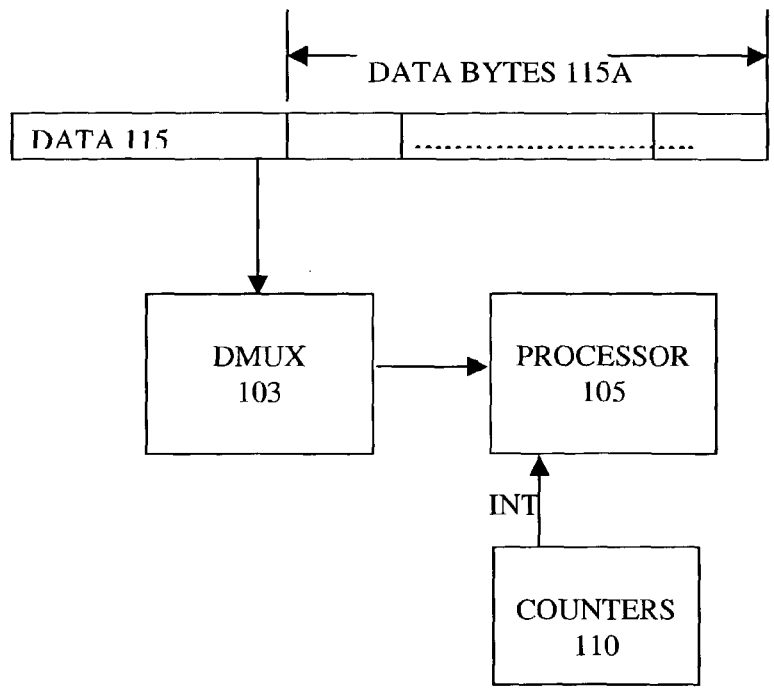
FIG. 1 is a block diagram of an exemplary system for operating on a predetermined number of bytes.

Referring now to FIG. 1, there is illustrated a block diagram describing an exemplary system for operating on a predetermined number of data bytes in accordance with an embodiment of the present invention. The system includes a DMUX 103, a processor 105, and at least one counter 110. The data is routed through the DMUX 103 to the processor 105. The processor 105 operates on the predetermined number of data bytes 115a by extracting individual bytes, or words from the data 115. The processor 105 extracts the data bytes/words 115a by executing an interrupt sensitive byte extract instruction.

The instructions executed by the processor, including the extract byte instruction, can be stored in a variety of different types of memory. For example, instructions can be stored in either firmware, such as in an embodiment where the processor is embedded in an application specific integrated circuit (ASIC).

The interrupt sensitive byte extract instruction is tightly coupled with an interrupt that is provided by the counters 110. In the absence of an interrupt from the counters 110, the interrupt sensitive byte extract instruction extracts individual bytes 115a from the data 115. However, in the presence of an interrupt from the counters, the interrupt sensitive extract byte instruction aborts the byte extraction function.

The data 115 can be provided from a variety of sources. For example, in one embodiment, the data can be provided from a memory system (not shown). When the processor 105 begins extracting the first byte 115a(1) of the predetermined number of data bytes 115a, the counter 110 is loaded with the predetermined number. As the processor 105 extracts the bytes 115a from the data 115, the processor sends a signal that is received by the counter 110 indicating that a byte is extracted. Responsive to receiving the signal, the counter 110 decrements. The foregoing continues until the counter 110 reaches zero. When the counter 110 reaches zero, the processor 105 has extracted the predetermined number of data bytes and the counter 110 generates an interrupt. The interrupt is transmitted to the processor via an interrupt line, INT.

As noted above, the presence of the interrupt causes any additional extract byte instructions to abort byte extraction. This prevents the processor from extracting in excess of the predetermined number of data bytes 115a from the data 115. The foregoing advantageously permits the processor 105 to operate on a predetermined number of data bytes using a single thread without checking the number of bytes remaining after each byte extraction.

In one embodiment, the data 115 can comprise a stream of data packets wherein the predetermined number of data bytes 115a is the length of the data packets in the stream. The instructions executed by the processor 105 can extract data from individual data packets and operate on the data in a single thread without continuously checking for the packet boundary. In another embodiment, the data packets can comprise digital video data.

Figure 2:
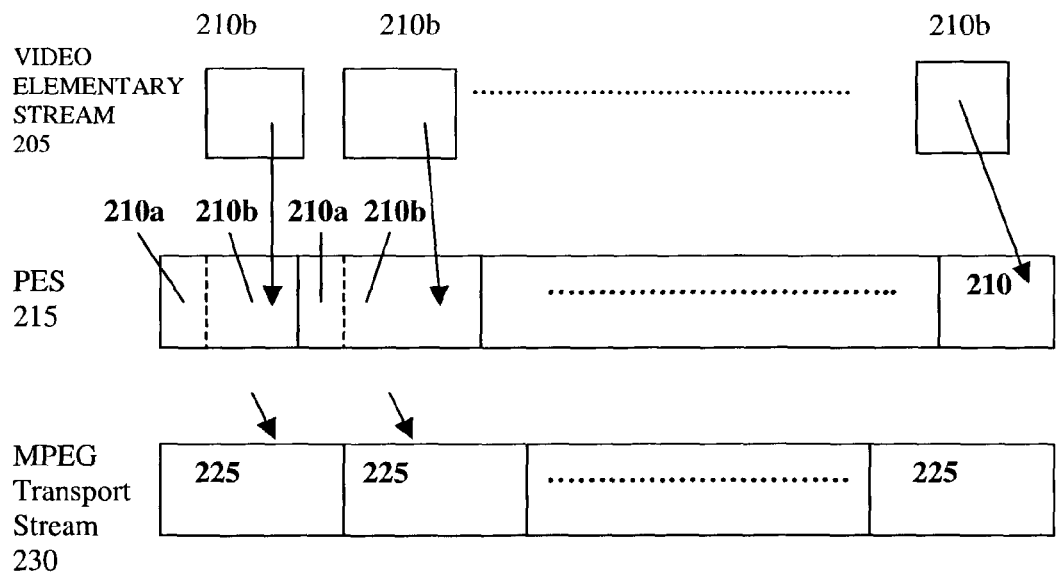
FIG. 2 is a block describing an exemplary encoding process for digital video.

Referring now to FIG. 2, there is illustrated a block diagram describing an encoding process for digital video. MPEG-2 and its predecessor MPEG-1 define the standards to compress video content 200 using a combination of various techniques to transform the video content into what is known as a video elementary stream 205. The video elementary stream 205 comprises a stream of compressed digital video data and is divided into segments 210b that form the payload portion of data packets 210. The concatenation of the data packets 210 form what is known as the Packetized Elementary Stream (PES) 215. The packets 210 forming the PES 215, known as PES packets 210, include a header 210a in addition to the payload 210b. The PES packet header 210a includes a number of fields, including PES_length which indicates the length of the PES packet, and PES_header_length which indicates the PES packet header 210a length. The PES 215 is then packetized into 188 byte MPEG transport packets 225. However, in the case of DirecTV™, the PES 215 is packetized into 130 byte MPEG transport packets 225. The concatenation of the MPEG transport packets 225 form the MPEG transport stream 230. A decoder receives and parses the MPEG transport stream 230.

Figure 3:
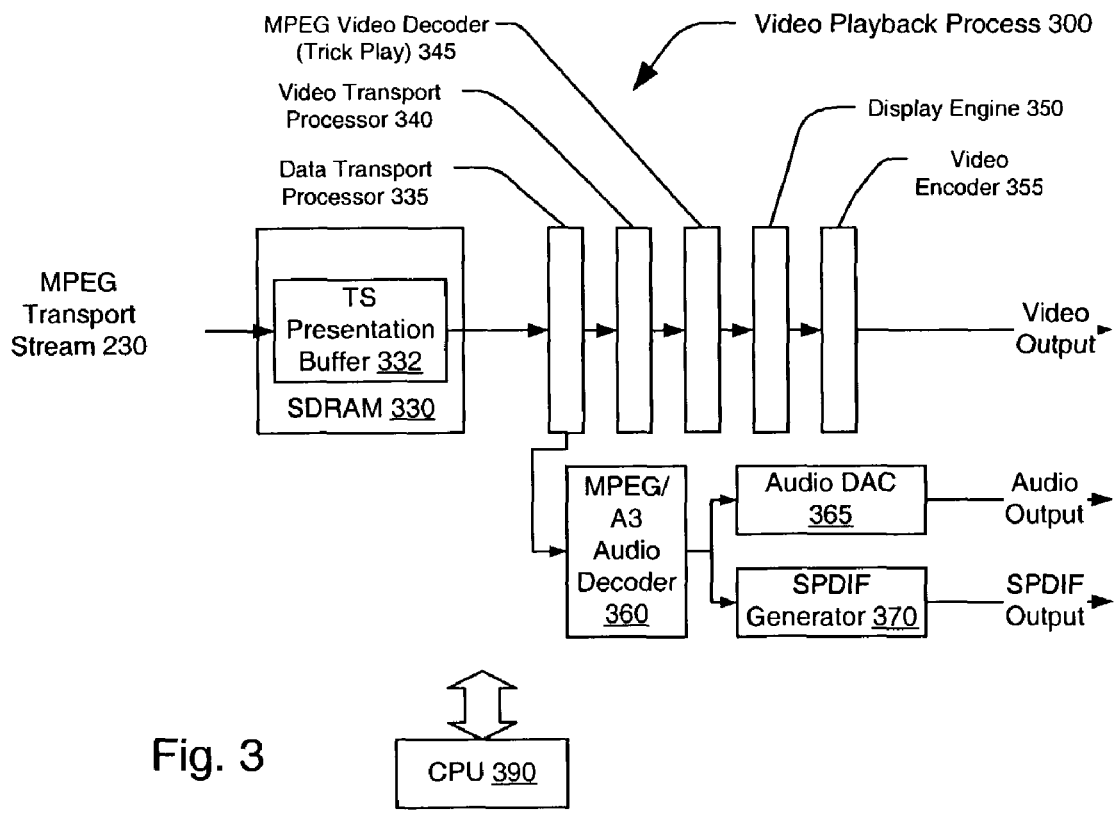
FIG. 3 is a block diagram of an exemplary decoder configured in accordance with certain aspects of the present invention.

Referring now to FIG. 3, there is illustrated a block diagram of a decoder configured in accordance with certain aspects of the present invention. A processor, that may include a CPU 390, reads the MPEG transport stream 230 into a transport stream buffer 332 within an SDRAM 330. The data is output from the transport stream presentation buffer 332 and is then passed to a data transport processor 335. The data transport processor then demultiplexes the MPEG transport stream 230 into it PES constituents and passes the audio transport stream to an audio decoder 360 and the video transport stream to a video transport processor 340 and then to an MPEG video decoder 345 that decodes the video. The audio data is sent to the output blocks and the video is sent to a display engine 350. The display engine 350 is responsible for and operable to scale the video picture, render the graphics, and construct the complete display among other functions. Once the display is ready to be presented, it is passed to a video encoder 355 where it is converted to analog video using an internal digital to analog converter (DAC). The digital audio is converted to analog in the audio digital to analog converter (DAC) 365.

The video transport processor 340 parses the video transport packets 225 of the video transport stream 230 by extracting bytes. In order to parse the video transport packets 225, the video transport processor 340 detects the boundaries of the MPEG transport packets 225, as well as the boundaries of the various PES fields 220. The video transport processor 340 detects boundaries by use of an interrupt sensitive extract byte instruction. The interrupt sensitive extract byte instruction is tightly coupled with timer-based interrupts which are indicative of the byte boundaries. The timer based interrupts are associated with counters that count the bytes extracted from the packet. When the counters indicate the occurrence of a boundary, the interrupts are triggered. The presence of the timer-based interrupts prevents the extract byte instruction from extracting bytes.

Figure 4:
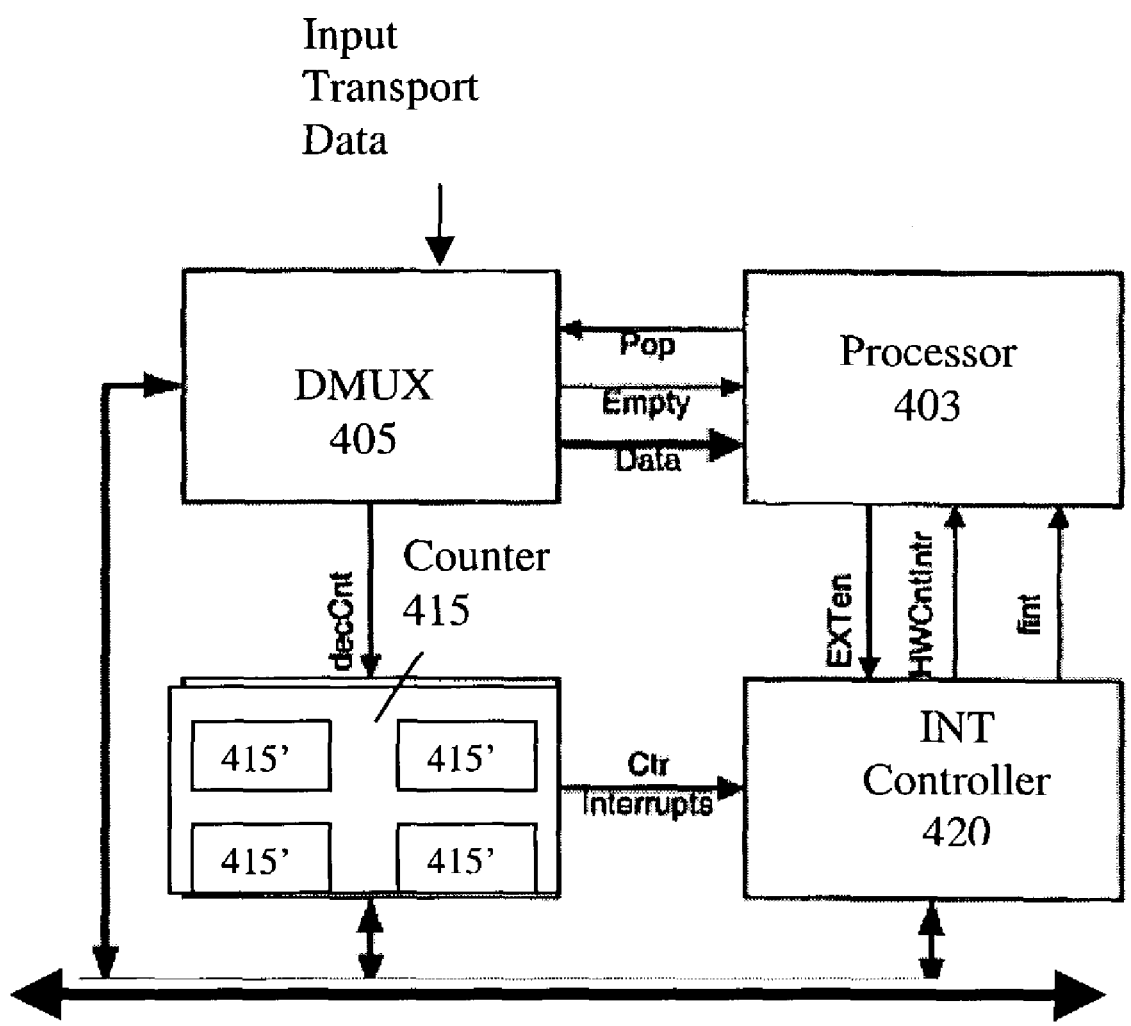
FIG. 4 is a block diagram of an exemplary transport processor in accordance with certain aspects of the present invention.

Referring now to FIG. 4, there is illustrated a block diagram of an exemplary video transport processor 342 in accordance with an embodiment of the present invention. The video transport processor 342 comprises processor 403, a demultiplexer 405, a counterblock 415, and an interrupt controller 420.

The demultiplexer 405 receives and decodes transport packets 225 via a processor system bus. The demultiplexer 405 can receive the data packets in two modes of operation. In one mode, the test mode, the demultiplexer 405 receives field data packets in bit serial form. In the other mode, a regular function mode, the demultiplexer 405 receives the data packets in byte serial form using a byte wide interface.

The demultiplexer 405 can extract bytes from the video transport packets 225. The processor 403 uses commands to direct various functions of the demultiplexer 405, via a connection, Pop <<WHAT DOES THIS STAND FOR>>. Among the various functions of the demultiplexer 405 is transferring the MPEG transport packet payload directly to memory, such as DRAM or providing extracted bytes to the processor via a data line. When the processor parses the MPEG transport packets, the processor processes the bytes of the header and commands the demultiplexer to transfer the payload to the memory. In the normal flow, the header information is consumed by the processor 403 and the payload is conumed by the DMUX 405.

The counterblock 415 includes any number of counters 415' used to count a certain number of extracted bytes. At the beginning of an MPEG transport packet, the processor 403 loads the counters 415' with various values. The various values can include, for example, transport packet length, transport packet header length, and the length of certain fields in the packet header. The processor 403 can determine the foregoing by examination of fields in the packet header. Alternatively, any or all of the counters 415' can be automatically loaded with a predetermined value at the beginning of the MPEG transport packet. The counters 415' decrement when bytes are extracted from the transport packets. When the processor 403 commands the demultiplexer 405 to extract bytes, the demultiplexer sends a signal to the counterblock 415, decCnt, causing the counterblocks 415 to decrement. Each of the counters 415' generates an interrupt when a counter 415' reaches 0.

In one embodiment, the counterblock 415 can include four counters 415'. The four counters can include two 8-bit counters and two 16-bit counters. One of the counters 415' is a general purpose counter automatically loaded with the transport packet length when the processor 403 begins parsing an MPEG transport packet. As noted above, the transport packet length is 188 bytes for most applications, however, the transport packet length is 130 bytes for DirecTV. The appropriate length is automatically loaded based on the type of MPEG transport packets. The remaining three counters 415' can be loaded by the processor 403 at the beginning of an MPEG transport packet.

The interrupts from the counters 415' are wired to the interrupt controller 420. The interrupt controller 420 comprises logic that receives the interrupts as input and selectively outputs interrupts based thereon to the processor 403 via firmware interrupt line, fint. Additionally, the logic can be configured to provide a delayed interrupt to the processor 403. For example, when a counter 415' expires and generates an interrupt, the interrupt controller 420 can defer the interrupt until the next instruction to extract a byte.

In one embodiment, four counter interrupts are wired to the interrupt controller 420 in two levels, 0 to 3, and 4 to 7. Level 0 has the highest priority and level 7 has the lowest priority. The higher priority interrupts are enabled when a counter 415' runs down during the extraction of the data using an extract byte type of instruction. The lower priority interrupts are triggered for the transfer command issued to the demultiplexer 405 when data is sent to memory. The foregoing segregation of counter interrupts as two sets with appropriate priority helps in achieving good functional partitioning of parsing and data payload transfer/drop in firmware.

The processor 403 parses the MPEG transport packets using interrupt sensitive extract byte instructions in firmware. The extract byte instructions cause the processor to extract bytes based on the presence of interrupts. In the absence of an interrupt from the interrupt controller 420 at firmware interrupt line, fint, the extract byte instruction causes the processor 403 to extract a byte from the MPEG transport packet. In the presence of an interrupt from the interrupt controller 420, the extract byte instruction aborts the byte extraction from the MPEG transport packet. At the next clock cycle, the processor 403 responds to the interrupt by executing an appropriate interrupt subroutine.

As noted above, the interrupts are triggered by expiration of the counters 415' which can be configured to count downwards a various numbers of bytes. When the transport packet length is loaded into a counter 415' at the beginning of an MPEG transport packet, the counter 415' reaches zero when all of the bytes of the MPEG transport packet are exhausted. The foregoing generates an interrupt via the interrupt controller preventing the next extract byte instruction from extracting bytes. Because the extract byte instruction does not extract bytes in the presence of the interrupt, the firmware at the processor 403 does not need to keep track of packet count after extraction of each byte. The foregoing allows the firmware to manage parsing and payload transfer efficiently, without maintaining different threads for different context.

The processor 403 can comprise, for example, a two stage 16-bit Reduced Instruction Set Computer (RISC) based on Harvard architecture with separate code and data memories. The processor instruction set can have two instruction sets, a basic instruction set and MPEG extension instruction set. The basic instruction set includes basic instructions such as arithmetic logic, shift, branch, and load/store operations. The MPEG extension instruction set includes instructions for video transport, including support for interrupt sensitive byte extraction.

Referring now to FIG. 5, there is illustrated a program flow diagram describing the operation of the video transport processor 442 in accordance with one embodiment of the present invention. The counter 415' is loaded with the value n. The processor 403 executes n extract byte instructions EXTBI Rx. As each extract byte instruction EXTBI Rx is executed by the processor 403, the counter 415' is decremented. During execution of the nth EXTBI Rx instruction, the counter 415' reaches zero and generates an interrupt, INT, to the interrupt controller 420. The interrupt controller 420 defers the interrupt INT until the processor 403 executes the n+1st extract byte instruction EXTBI Rx. When the processor 403 executes n+1st extract byte instruction, the interrupt controller 420 transmits the interrupt, INT. The presence of the interrupt INT causes the extract byte instruction, EXTBI Rx to abort extraction of the n+1st byte and set the program counter of the processor 442 to the address of an interrupt subroutine, ISR. After completion of the ISR, the program counter is reloaded with the return address and execution is resume.

Referring now to FIG. 6, there is illustrated a program flow diagram describing the operation of the video transport processor 442 in accordance with another embodiment of the present invention. The counter 415' is loaded with the value n. The processor 403 executes n extract byte instructions EXTBI Rx. As each extract byte instruction EXTBI Rx is executed by the processor 403, the counter 415' is decremented. During execution of the nth EXTBI Rx instruction, the counter 415' reaches zero and generates an interrupt, INT. The interrupt controller 420 transmits the interrupt, INT to the processor 403. The presence of the interrupt INT causes the processor 442 to jump to the address of an interrupt subroutine, ISR. After completion of the ISR, the program counter is reloaded with the return address and execution is resume.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A system for extracting bytes of data from packets, said system comprising:
   a processor for executing a plurality of instructions, said plurality of instructions further comprising a single instruction, wherein said single instruction causes the processor to extract the bytes from a packet until receiving an interrupt;
   a counter for counting bytes extracted by the processor, and interrupting the processor when the counter counts a length of the packet; and an interrupt controller for delaying the interrupt from the counter to the processor for a predetermined period of time.

2. The system of claim 1, wherein the packets comprise MPEG transport packets.

3. The system of claim 1, wherein the packet comprises 126 bytes.

4. The system of claim 1, wherein the length of the packet comprises 188 bytes.

5. A system for extracting bytes of data from packets, said system comprising:

a processor for executing a plurality of instructions, said plurality of instructions further comprising a single instruction, wherein said single instruction causes the processor to extract the bytes from a packet until receiving an interrupt;

a counter for counting bytes extracted by the processor, and interrupting the processor when the counter counts a length of a payload of the packet; and an interrupt controller for delaying the interrupt from the counter to the processor for a predetermined period of time.

6. The system of claim 5, wherein the packets comprise MPEG transport packets.

7. The system of claim 5, wherein the length of the packet is 126 bytes.

8. The system of claim 5, wherein the length of the packet is 188 bytes.

* * * * *